United States Patent
Kang (10) Patent No.: US 7,263,239 B2
(45) Date of Patent: Aug. 28, 2007

(54) METHOD FOR RESIZING IMAGES USING THE INVERSE DISCRETE COSINE TRANSFORM

(75) Inventor: Jung Yong Kang, Kyunggi-do (KR)

(73) Assignee: Humax Co., Ltd., Kyonggi-do (KR)

( * ) Notice: Subject to any disclaimer, the term of this patent is extended or adjusted under 35 U.S.C. 154(b) by 734 days.

(21) Appl. No.: 10/373,691

(22) Filed: Feb. 27, 2003

(65) Prior Publication Data

US 2004/0076334 A1    Apr. 22, 2004

(30) Foreign Application Priority Data

Oct. 17, 2002    (KR)    ............... 10-2002-0063600

(51) Int. Cl.
*G06K 9/36* (2006.01)
*G06K 9/46* (2006.01)

(52) U.S. Cl. ............... 382/250

(58) Field of Classification Search ........... 382/250
See application file for complete search history.

(56) References Cited

U.S. PATENT DOCUMENTS

| | | | | |
|---|---|---|---|---|
| 5,740,284 A | * | 4/1998 | Wober et al. | 382/250 |
| 6,002,809 A | * | 12/1999 | Feig et al. | 382/298 |
| 6,072,834 A | * | 6/2000 | Kim et al. | 375/240 |
| 6,262,770 B1 | * | 7/2001 | Boyce et al. | 348/402.1 |
| 6,563,955 B2 | * | 5/2003 | de Queiroz | 382/239 |
| 6,694,342 B1 | * | 2/2004 | Mou | 708/402 |
| 6,704,358 B1 | * | 3/2004 | Li et al. | 375/240.02 |
| 2003/0021486 A1 | * | 1/2003 | Acharya | 382/250 |

* cited by examiner

*Primary Examiner*—Wenpeng Chen
*Assistant Examiner*—Yuzhen Ge
(74) *Attorney, Agent, or Firm*—Birch, Stewart, Kolasch & Birch, LLP

(57) ABSTRACT

A method for resizing images using the inverse discrete cosine transform (IDCT). The method enables digital video processing devices such as DVD players, digital broadcast receivers, or HD TVs to enlarge an original image to an arbitrary size without resulting in distortions in the enlarged image, thereby preventing deteriorated image quality.

8 Claims, 7 Drawing Sheets

*zero-appended DCT coefficient block*

| $kd'_{1,1}$ | $kd'_{1,2}$ | $kd'_{1,3}$ | --- | $kd'_{1,m}$ | $0_{1,m+1}$ | $0_{1,m+2}$ | --- | $0_{1,p}$ |
|---|---|---|---|---|---|---|---|---|
| $kd'_{2,1}$ | $kd'_{2,2}$ | $kd'_{2,3}$ | --- | $kd'_{2,m}$ | $0_{2,m+1}$ | $0_{2,m+2}$ | --- | $0_{2,p}$ |
| $kd'_{3,1}$ | $kd'_{3,2}$ | $kd'_{3,3}$ | --- | $kd'_{3,m}$ | $0_{3,m+1}$ | $0_{3,m+2}$ | --- | $0_{3,p}$ |
| ⋮ | ⋮ | ⋮ | ⋮ | ⋮ | ⋮ | ⋮ | ⋮ | ⋮ |
| $kd'_{n,1}$ | $kd'_{n,2}$ | $kd'_{n,3}$ | --- | $kd'_{n,m}$ | $0_{n,m+1}$ | $0_{n,m+2}$ | --- | $0_{n,p}$ |
| $0_{n+1,1}$ | $0_{n+1,2}$ | $0_{n+1,3}$ | --- | $0_{n+1,m}$ | $0_{n+1,m+1}$ | $0_{n+1,m+2}$ | --- | $0_{n+1,p}$ |
| ⋮ | ⋮ | ⋮ | ⋮ | ⋮ | ⋮ | ⋮ | ⋮ | ⋮ |
| $0_{q,1}$ | $0_{q,2}$ | $0_{q,3}$ | --- | $0_{q,m}$ | $0_{q,m+1}$ | $0_{q,m+2}$ | --- | $0_{q,p}$ |

⇩ $IDCT\ (P \times Q)$

*enlarged image block*

| $a'_{1,1}$ | $a'_{1,2}$ | $a'_{1,3}$ | --- | $a'_{1,m}$ | $a'_{1,m+1}$ | $a'_{1,m+2}$ | --- | $a'_{1,p}$ |
|---|---|---|---|---|---|---|---|---|
| $a'_{2,1}$ | $a'_{2,2}$ | $a'_{2,3}$ | --- | $a'_{2,m}$ | $a'_{2,m+1}$ | $a'_{2,m+2}$ | --- | $a'_{2,p}$ |
| $a'_{3,1}$ | $a'_{3,2}$ | $a'_{3,3}$ | --- | $a'_{3,m}$ | $a'_{3,m+1}$ | $a'_{3,m+2}$ | --- | $a'_{3,p}$ |
| ⋮ | ⋮ | ⋮ | ⋮ | ⋮ | ⋮ | ⋮ | ⋮ | ⋮ |
| $a'_{n,1}$ | $a'_{n,2}$ | $a'_{n,3}$ | --- | $a'_{n,m}$ | $a'_{n,m+1}$ | $a'_{n,m+2}$ | --- | $a'_{n,p}$ |
| $a'_{n+1,1}$ | $a'_{n+1,2}$ | $a'_{n+1,3}$ | --- | $a'_{n+1,m}$ | $a'_{n+1,m+1}$ | $a'_{n+1,m+2}$ | --- | $a'_{n+1,p}$ |
| ⋮ | ⋮ | ⋮ | ⋮ | ⋮ | ⋮ | ⋮ | ⋮ | ⋮ |
| $a'_{q,1}$ | $a'_{q,2}$ | $a'_{q,3}$ | --- | $a'_{q,m}$ | $a'_{q,m+1}$ | $a'_{q,m+2}$ | --- | $a'_{q,p}$ |

FIG. 4 zero-appended DCT coefficient block

IDCT (P x Q)

enlarged image block

METHOD FOR RESIZING IMAGES USING THE INVERSE DISCRETE COSINE TRANSFORM

This nonprovisional application claims priority under 35 U.S.C. § 119(a) on Patent Application No. 2002-0063600 filed in KOREA on Oct. 17, 2002, which is herein incorporated by reference.

BACKGROUND OF THE INVENTION

1. Field of the Invention

The present invention relates generally to a method for resizing an image using the inverse discrete cosine transform (IDCT) and, more particularly, but not by way of limitation, to a method for enlarging an original image to an arbitrary resolution.

2. Description of the Related Art

A typical method for enlarging an image is to process the image in the pixel domain, wherein the number of pixels is increased by interpolating the pixels of the original image based upon the correlations of the pixels. This method, however, has several drawbacks. It requires a complicated algorithm for computing the correlation of each of the adjacent pixel values, and moreover, the quality of the increased-size image may be deteriorated by the interpolation operations.

Another method for enlarging an image is to process the image in the spatial frequency domain using the discrete cosine transform (DCT). An original image is divided into two-dimensional image blocks, for example, image blocks of size 8×8 pixels, and a DCT operation is performed on each of the image blocks to produce a DCT coefficient block having low and high spatial frequency components.

It is well known that the combination of DCT and quantization results in many of the frequency components being zero, especially the coefficients for high spatial frequencies because most of the energy in the original image is typically concentrated in low spatial frequencies. A common method taking advantage of this feature appends columns and rows of zeros to the high frequency area in the DCT coefficient block for increasing the size of the DCT coefficient block to integral multiples of 8×8, for example, 16×16 or 24×24. An inverse DCT operation on the increased-size DCT coefficient block leads to an enlarged image block.

The frequency-domain method is expected to gather popularity for resizing images because the algorithm is relatively simple and does not deteriorate the quality of the enlarged image. Methods for resizing images in the spatial frequency domain are disclosed in, for example, U.S. Pat. No. 5,737,019 issued Apr. 7, 1998, Korea patent application Ser. No. 1999-64158 filed Jul. 25, 1999, and Korea patent application Ser. No. 2001-49039 filed at Jun. 15, 2001.

While the methods disclosed in the referenced patents and applications show good results, there is a major limitation that an image cannot be enlarged to an arbitrary size and can only be enlarged to integral multiple times its original size. Also, adequate schemes for preventing possible distortions in an image after the image is enlarged to an arbitrary size have not been addressed yet.

SUMMARY OF THE INVENTION

It is therefore an object of the present invention to provide a method for enlarging an image to an arbitrary size without resulting in possible distortions in the enlarged image using the inverse discrete cosine transform (IDCT).

A method for resizing an original image using the inverse discrete cosine transform (IDCT) in accordance with the present invention is characterized in that it comprises, wherein an original image is divided into image blocks and each of the image blocks is discrete cosine transformed, the steps of: receiving discrete cosine transformed image blocks of size M×N, determining the size P×Q to which each of the discrete cosine transformed image blocks is to be enlarged, and appending rows and columns of zeros to the high frequency area of each of the discrete cosine transformed image blocks so that the size of each of the discrete cosine transformed image blocks becomes the determined size P×Q; computing a k-coefficient for the zero-appended discrete cosine transformed image blocks and multiplying each of the zero-appended discrete cosine transformed image blocks by the k-coefficient; and performing IDCT operations on the zero-appended discrete cosine transformed image blocks multiplied by the k-coefficient to produce enlarged image blocks of size P×Q.

Another method for resizing an original image using IDCT in accordance with the present invention is characterized in that it comprises, wherein an original image is divided into image blocks and each of the image blocks is discrete cosine transformed, the steps of: receiving discrete cosine transformed image blocks of size M×N from a digital broadcast; determining the size P×Q to which each of the discrete cosine transformed image blocks is to be enlarged and appending rows and columns of zeros to the high frequency area of each of the discrete cosine transformed image blocks so that the size of each of the discrete cosine transformed image blocks becomes the determined size P×Q; computing a k-coefficient for the zero-appended discrete cosine transformed image blocks and multiplying each of the zero-appended discrete cosine transformed image blocks by the k-coefficient; performing IDCT operations on the zero-appended discrete cosine transformed image blocks multiplied by the k-coefficient to produce enlarged image blocks of size P×Q; and producing an enlarged image by combining the enlarged image blocks of size P×Q.

Another method for resizing an original image using IDCT in accordance with the present invention is characterized in that it comprises, wherein an original image is divided into image blocks and each of the image blocks is discrete cosine transformed, the steps of: receiving discrete cosine transformed image blocks of size M×N from a data stream reproduced from a storage medium; determining the size P×Q to which each of the discrete cosine transformed image blocks is to be enlarged and appending rows and columns of zeros to the high frequency area of each of the discrete cosine transformed image blocks so that the size of each of the discrete cosine transformed image blocks becomes the determined size P×Q; computing a k-coefficient for the zero-appended discrete cosine transformed image blocks and multiplying each of the zero-appended discrete cosine transformed image blocks by the k-coefficient; performing IDCT operations on the zero-appended discrete cosine transformed image blocks multiplied by the k-coefficient to produce enlarged image blocks of size P×Q; and producing an enlarged image by combining the enlarged image blocks of size P×Q.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENT

In order that the invention may be fully understood, preferred embodiments thereof will now be described with reference to the accompanying drawings.

Figure 1:
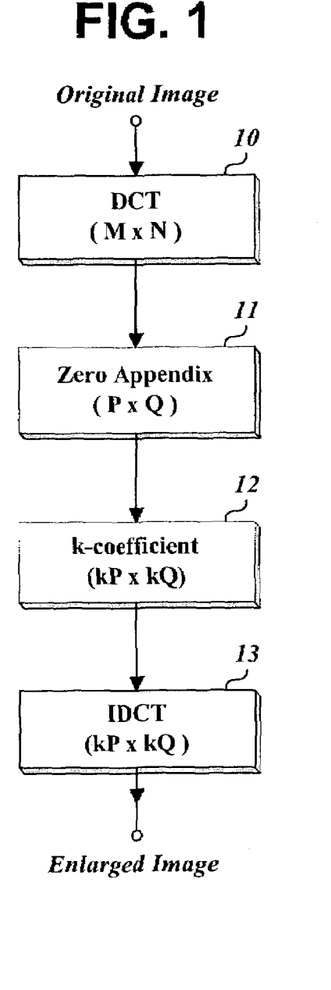
FIG. 1 depicts the structure of an image resizing apparatus embodying the invention.

FIG. 1 depicts the structure of an image resizing apparatus such as an image scaler in accordance with the present invention. The apparatus comprises a discrete cosine transform (DCT) unit 10, a zero appending unit 11, a k-coefficient multiplying unit 12, and an inverse discrete cosine transform (IDCT) unit 12.

Figure 2:
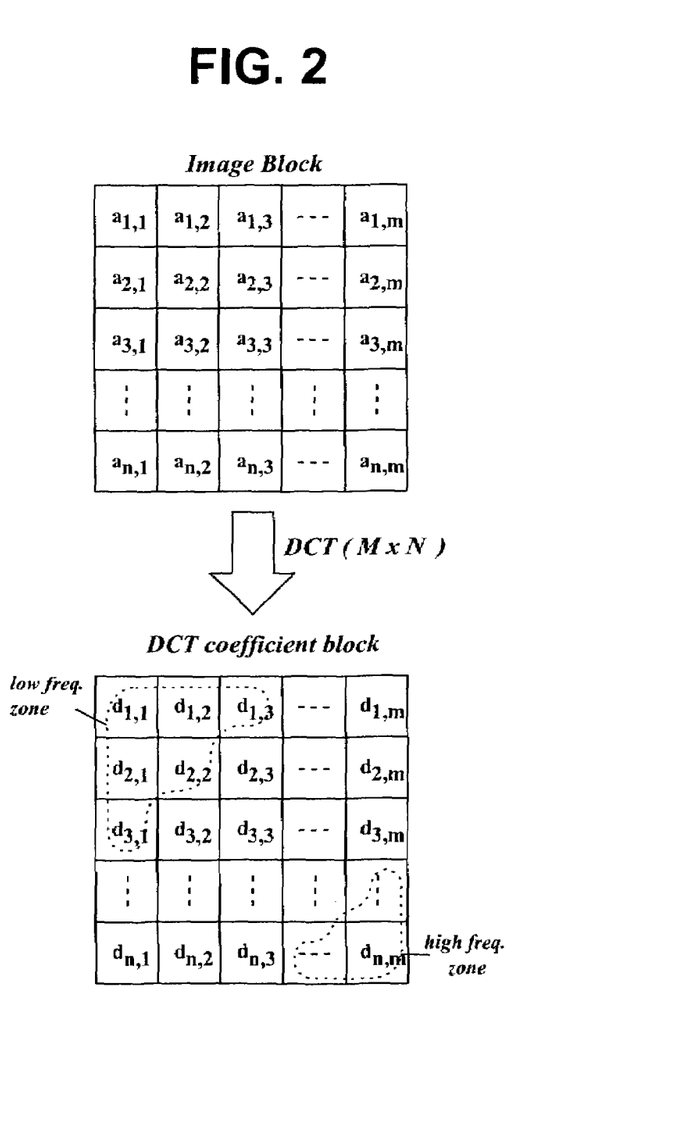
FIGS. 2 and 3 are graphical depictions of the procedure for resizing images in accordance with the invention.

The DCT unit 10 divides an original image into image blocks of size m×n pixels and performs a DCT operation (DCT(m×n)) on each image block ($a_{1,1} \sim a_{n,m}$) to produce a corresponding DCT coefficient block ($d_{1,1} \sim d_{n,m}$) of size m×n as shown in FIG. 2.

The zero appending unit 11 appends rows and columns of zeros to the high frequency area in each received DCT coefficient block ($d_{1,1} \sim d_{n,m}$). The number of appended rows of zeros is not necessarily an integral multiple of the number of rows of the image block ($a_{1,1} \sim a_{n,m}$) and depends only on the number of rows of the enlarged image. Likewise, the number of appended columns of zeros is not necessarily an integral multiple of the number of columns of the image block ($a_{1,1} \sim a_{n,m}$) and depends only on the number of columns of the enlarged image.

Figure 3:
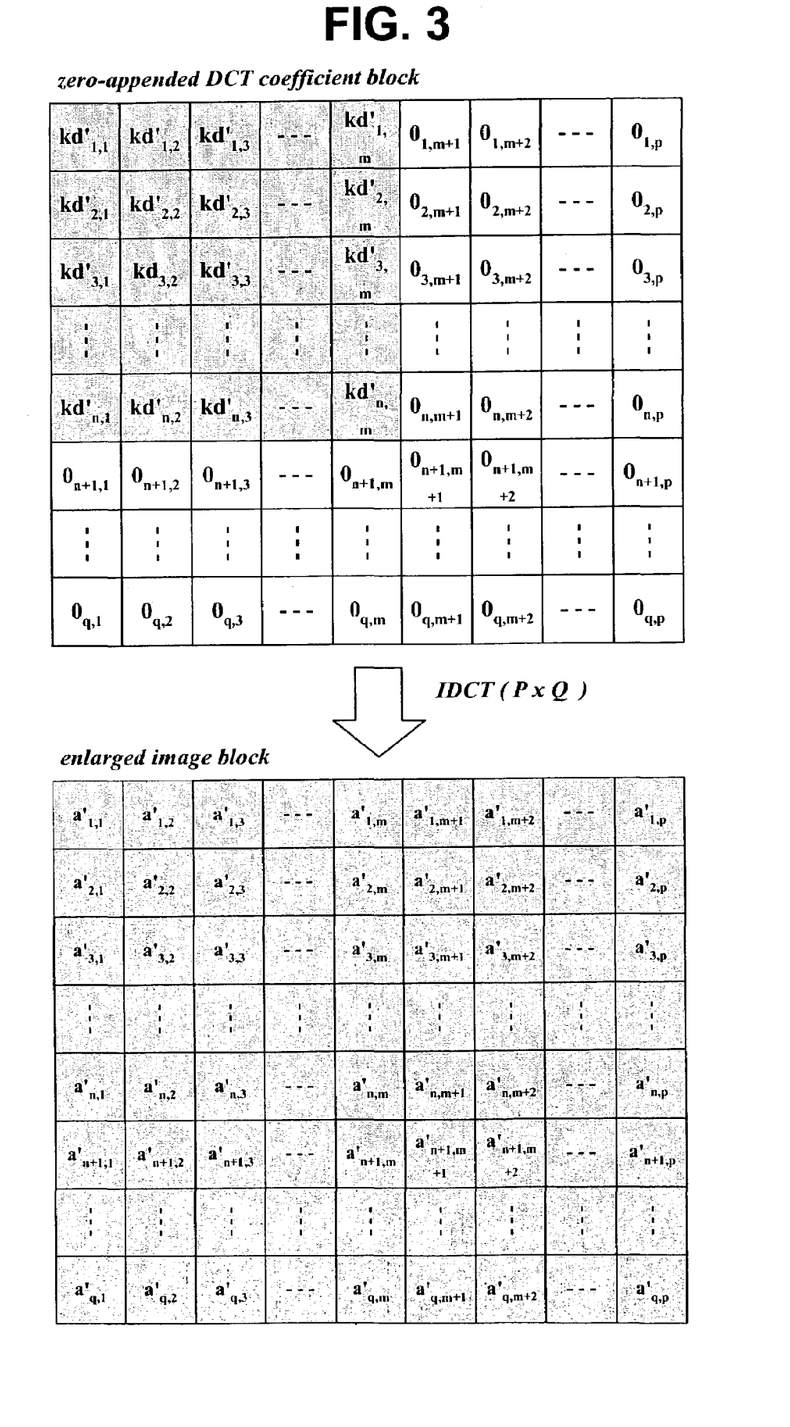

As depicted in FIG. 3, the k-coefficient multiplying unit 12 multiplies each element of the zero-appended DCT coefficient block ($a_{1,1} \sim 0_{q,p}$) by the k-coefficient with a view to preventing the resulting enlarged image from becoming distorted. The k-coefficient is determined by the numbers of rows and columns of the DCT coefficient blocks before and after rows and columns of zeros are appended.

The IDCT unit 13 finally produces an image block ($a'_{1,1} \sim a'_{q,p}$) the size of which is increased to p×q by performing an IDCT operation on the zero-appended DCT coefficient block multiplied by the k-coefficient ($kd'_{1,1} \sim 0_{q,p}$) as shown in FIG. 3.

The above procedure leads to an image enlarged to an arbitrary resolution without having the resulting enlarged image distorted. Several exemplary embodiments of the invention will be explained below.

Figure 4:
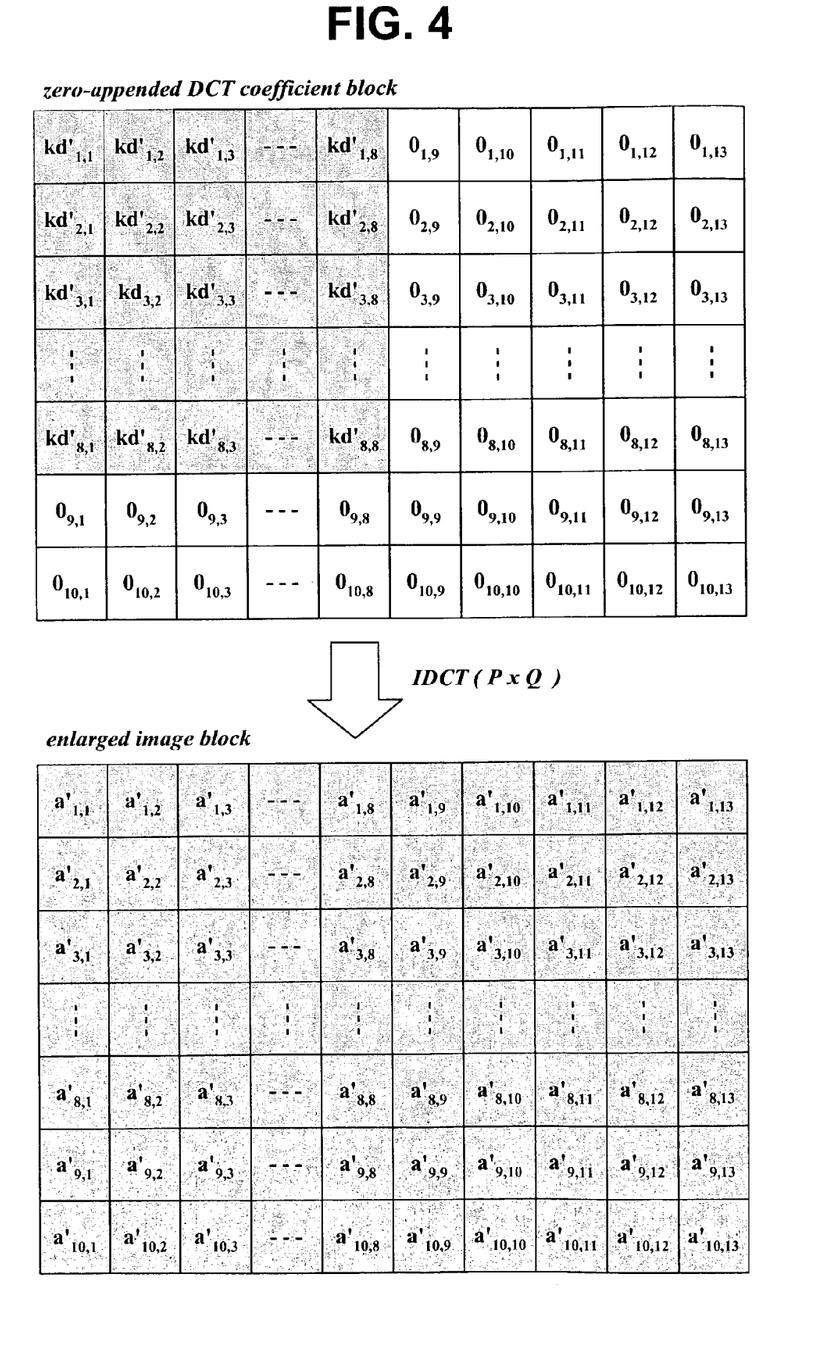
FIG. 4 is a graphical depiction of the procedure for resizing images in accordance with one embodiment of the invention.

Consider embodiments in FIG. 4. The DCT unit 10 divides an original image into image blocks of size 8×8 pixels and performs a DCT operation (DCT(8×8)) on each image block ($a_{1,1} \sim a_{8,8}$) to produce a corresponding DCT coefficient block of size 8×8 ($d_{1,1} \sim d_{8,8}$).

The zero appending unit 11 appends 5 columns of zeros to the right of the DCT coefficient block ($d_{1,1} \sim d_{8,8}$) and 2 rows of zeros to the bottom of the DCT coefficient block. The numbers of rows and columns of zeros depend only on the size of the image to be obtained by resizing.

The k-coefficient multiplying unit 12 multiplies each element of the zero-appended DCT coefficient block ($a_{1,1} \sim 0_{10,13}$) by the k-coefficient and then the IDCT unit 13 produces an enlarged image block ($a'_{1,1} \sim a'_{10,13}$) the size of which is increased to 13×10 pixels by performing an IDCT operation on the zero-appended DCT coefficient block multiplied by the k-coefficient ($ka'_{1,1} \sim k0_{10,13}$) as shown in FIG. 4.

Figure 5:
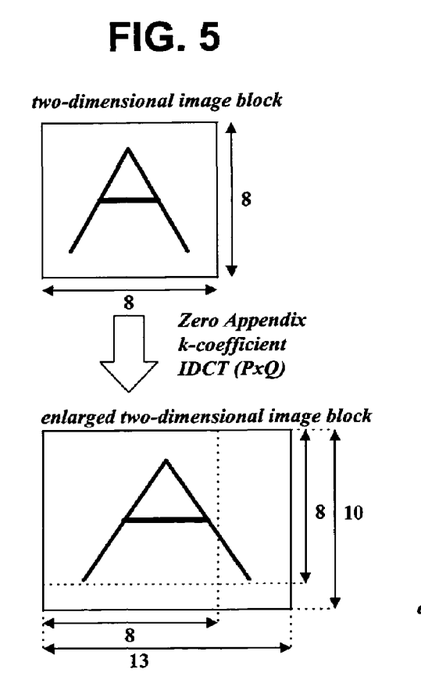
FIGS. 5 and 6 are exemplary graphical images enlarged in accordance with the invention.
Figure 6:
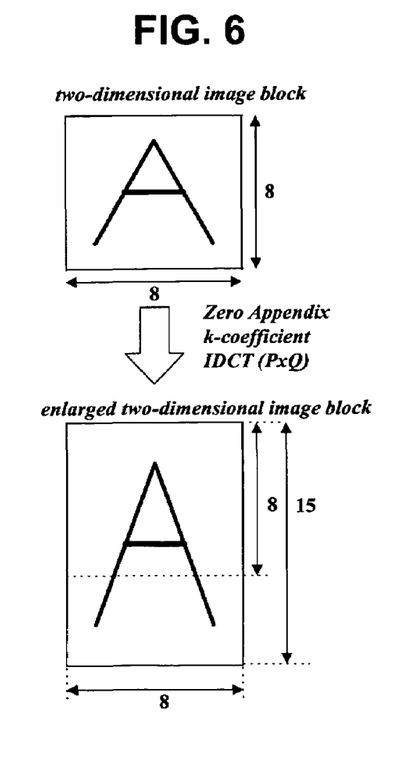

As a result, the two-dimensional image block of size 8×8 pixels is transformed into an enlarged image block of size 13×10 pixels as shown in FIG. 5, in which the numbers of rows and columns of the enlarged image block are not integral multiples of the numbers of rows and columns of the original image block, respectively.

Similarly, a two-dimensional image block of size 8×8 pixels can be transformed to an increased-size image block of size 15×8 pixels by performing a DCT operation, appending rows and columns of zeros, multiplying the k-coefficient, and performing a IDCT operation as explained above. In summary, an image block can be enlarged to an arbitrary size that is not integral multiple times its original size.

Consider another embodiment in which a standard definition (SD) image of size 720×480 pixels upconverted to a high definition (HD) image having 1,920×1,080 pixels. In this case, the DCT unit 10 divides the original image into 90×60 image blocks each of which is of size 8×8 pixels and performs a DCT operation on each of the 90×60 image blocks. To obtain an enlarged image of size 1,920×1,080 pixels, each DCT coefficient block should be enlarged to a DCT coefficient block having 18 rows and 21.3 columns. Since 21.3 columns are not feasible, 21.3 is approximated to the closest integer, 21. Each DCT coefficient block, therefore, is enlarged to an increased-size DCT coefficient block having 18 rows and 21 columns by appending 10rows of zeros and 13 columns of zeros in the high frequency area of the original DCT coefficient block. An IDCT operation on each of the enlarged 21×18 DCT coefficient blocks finally produces the enlarged HD image block having a resolution of 1,890×1,080 pixels.

To upconvert an original image of size 720×480 pixels to an image of size 1,280×720 pixels, the DCT unit 10 divides the original image into 90×60 image blocks each of which is of size 8×8 pixels and performs a DCT operation on each of the 90×60 image blocks. To obtain an enlarged image of size 1,280×720 pixels, each image block of size 8×8 pixels is to be enlarged to an image block of size 14.2×12 pixels. Since 14.2 is not an integer, the closest integer, 14, is employed instead. As a result, each DCT coefficient block is enlarged to a DCT coefficient block of size 14×12 by appending 4 rows and 6 columns of zeros in the high frequency area of the original DCT coefficient block. An IDCT operation on each of the enlarged DCT coefficient blocks leads to the enlarged HD image having a resolution of 1,260×720 pixels.

The zero appending unit 11 calculates how many rows and columns of zeros should be appended to each DCT coefficient block with reference to the size of the original image block and that of the enlarged image block of a required size. In case the number of rows or columns of zeros to be appended is not an integer, the closest integer is used instead.

As yet another embodiment of the invention, the DCT unit 10 may use one of common divisors of the size of an original image block and that of the resulting resized image block.

Suppose that the size of an image is increased from 1,280×720 pixels to 1,920×1,080 pixels. The DCT unit 10 selects 160, one of the common divisors of 1,280 and 1,920 and 72, one of the common divisors of 720 and 1,080, and divides the original image into image blocks of size 8×10 pixels so that the number of resulting image blocks becomes 160×72. Then, the DCT unit 10 performs a DCT operation on each of the 160×72 image blocks after appending 4 columns and 5 rows of zeros to the DCT coefficient block to increase the size of an image block from 8×10 pixels to 12×15 pixels. An IDCT operation on each of the enlarged DCT coefficient blocks produces an enlarged image of size 1,920×1,080 pixels.

It is also possible to perform a DCT operation on an original image as a whole and to perform an IDCT operation on the corresponding DCT coefficient block after appending rows and columns of zeros to the DCT coefficient block as many as required for obtaining an enlarged image.

The method for computing the k-coefficient used in the k-coefficient multiplying unit 12 is described below.

The method for enlarging an image in accordance with the invention uses the two-dimensional DCT. The method, however, is described using the one-dimensional DCT to make it understood more easily. Because the two-dimensional DCT uses the fundamental operation of the one-dimensional DCT, the below explanation can be easily extended to the case of two-dimensional DCT.

The two dimensional DCT can be expressed as:

$$F(u, v) = \frac{2c(u)c(v)}{\sqrt{MN}} \sum_{m=0}^{M-1} \sum_{n=0}^{N-1} f(m, n)\cos\frac{(2m+1)u\pi}{2M}\cos\frac{(2n+1)v\pi}{2N},$$

$$u = 0, 1, \Lambda \, M-1$$
$$v = 0, 1, \Lambda \, N-1$$ with $$c(k) = \begin{cases} \frac{1}{\sqrt{2}} & k=0 \\ 1 & \text{otherwise} \end{cases}.$$

After some manipulations, the above equation can be rewritten as:

$$F(u, v) =$$
$$\sqrt{\frac{2}{M}} c(u) \sum_{m=0}^{M-1} \left\{ \sqrt{\frac{2}{N}} c(v) \sum_{n=0}^{N-1} f(m, n)\cos\frac{(2n+1)v\pi}{2N} \right\} \cos\frac{(2m+1)u\pi}{2M},$$

$$u = 0, 1, \Lambda \, M-1$$
$$v = 0, 1, \Lambda \, N-1$$

which states that the two-dimensional DCT can be interpreted as an M point one-dimensional DCT of the result of a preceding N point one-dimensional DCT expressed as:

$$F(k) = \sqrt{\frac{2}{N}} c(k) \sum_{n=0}^{N-1} f(n)\cos\frac{(2n+1)k\pi}{2N}, k = 0, 1, \Lambda \, n-1 \text{ with}$$

$$c(k) = \begin{cases} \frac{1}{\sqrt{2}} & k=0 \\ 1 & \text{otherwise} \end{cases}.$$

For this reason, the following explanation will be given with reference to an example of the one-dimensional DCT instead. The above equation of the one-dimensional DCT can be rewritten as the following matrix equation:

$$\begin{bmatrix} F(0) \\ F(1) \\ \vdots \\ F(N-1) \end{bmatrix} =$$

$$C(N) \begin{bmatrix} 1 & 1 & \cdots & 1 \\ \cos\frac{\pi}{2N} & \cos\frac{3\pi}{2N} & \cdots & \cos\frac{(2N-1)\pi}{2N} \\ \vdots & \vdots & \cdots & \vdots \\ \cos\frac{(2N-1)\pi}{2N} & \cos\frac{(2N-1)3\pi}{2N} & \cdots & \cos\frac{(2N-1)(N-1)\pi}{2N} \end{bmatrix}$$

$$\begin{bmatrix} f(0) \\ f(1) \\ \vdots \\ f(N-1) \end{bmatrix} \text{ with}$$

$$C(N) = \begin{bmatrix} \sqrt{\frac{1}{N}} & 0 & 0 & \cdots & 0 \\ 0 & \sqrt{\frac{2}{N}} & 0 & \cdots & 0 \\ 0 & \cdots & \sqrt{\frac{2}{N}} & \cdots & 0 \\ \vdots & \vdots & \vdots & \cdots & 0 \\ 0 & 0 & 0 & \cdots & \sqrt{\frac{2}{N}} \end{bmatrix}.$$

Figure 7:
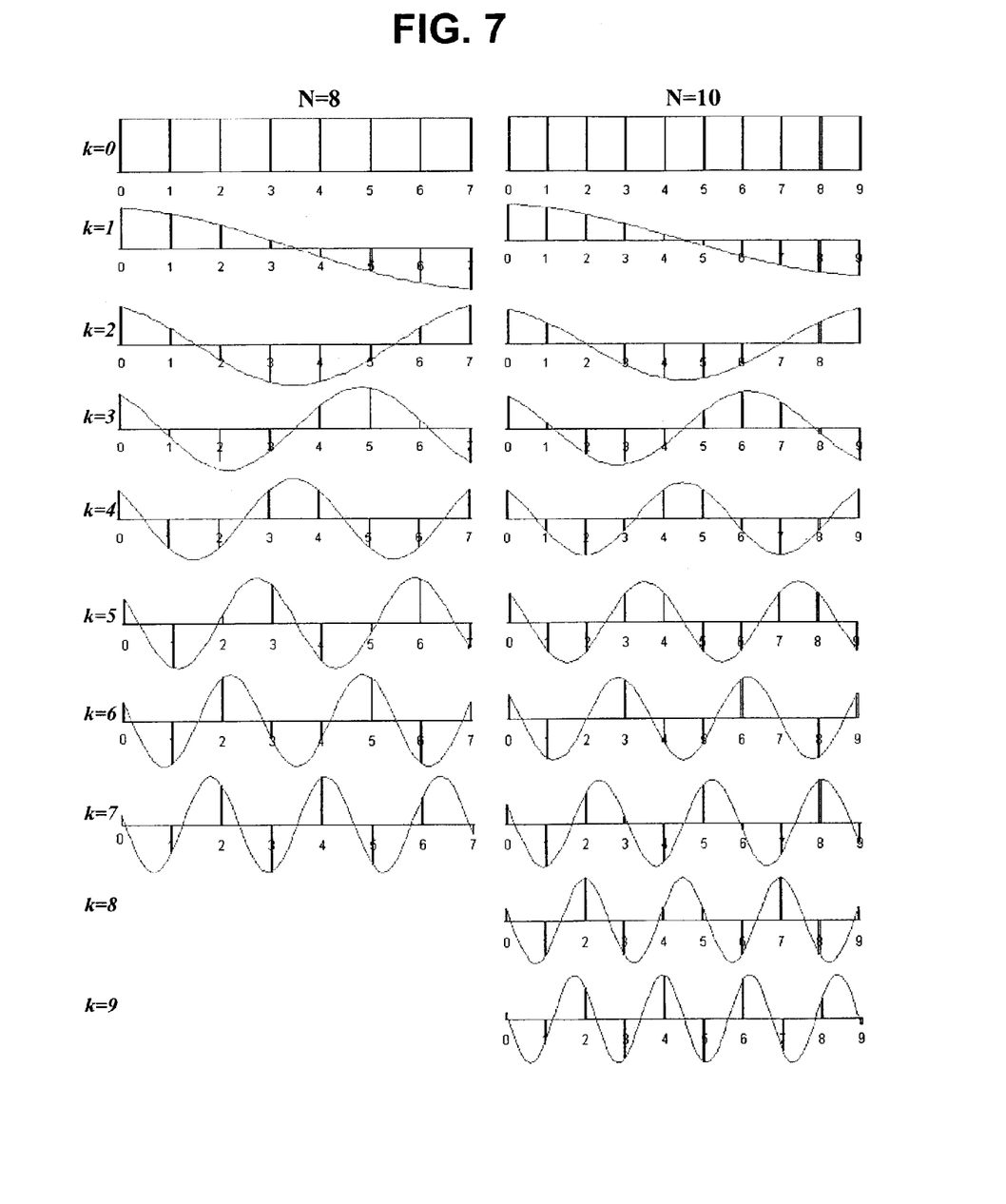
FIGS. 7 and 8 are graphical depictions for explaining how to compute the k-coefficient.

In the above matrix equation, a DCT coefficient F(k) is computed by multiplying f(k) by the corresponding cosine coefficients at k=0~N−1 and adding each of the multiplied values. FIG. 7 depicts the cosine coefficients by which f(k) is multiplied at k=0~N−1 when N=8 and N=10.

Figure 8:
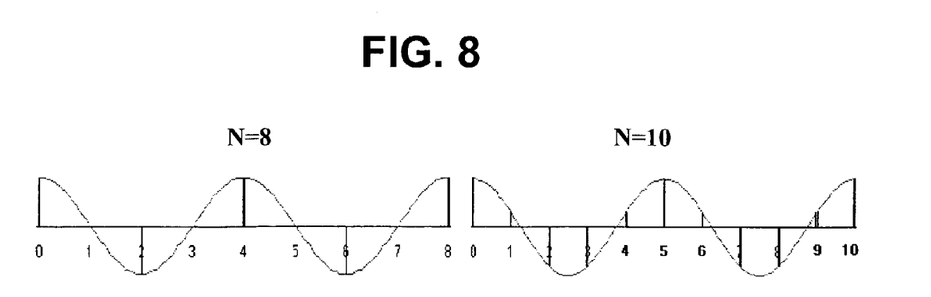

FIG. 8 depicts an example for increasing N from 8 to 10. It is shown that as N increases so does the number of the cosine coefficients while the envelopes of the cosine coefficients of the two cases are the same. In other words, the cosine coefficients are obtained by sampling the same cosine function without regard to the value of N, but as N increases, so does the number of the samples.

Computing a DCT coefficient requires multiplications of the cosine coefficients shown in FIG. 8 with f(k) at k=0~N−1. When N is increased from 8 to 10, it is clear that signals of the same slope are multiplied by the cosine coefficients of the same slope at k=0~7 without regard to the value of N.

The only difference between the cases with N=8 and N=10 lies in the number of the multiplication terms to be summed, that is, the number of the terms equals the value of N. From this fact, the relation between the coefficients with N=8 and N=10 can be expressed as:

$$F_{10}(k) \propto \frac{10}{8} F_8(k).$$

It is seen that all of the off-diagonal elements of the matrix C(N) are zero and the diagonal elements are inversely proportional to $\sqrt{N}$. When C(N) is taken into consideration, therefore, the relation between $F_{10}(k)$ and $F_8(k)$ can be written as:

$$F_{10}(k) = \sqrt{\frac{10}{8}} F_8(k).$$

Furthermore, when the input dimension N is extended from n to m (m>n), the relation between $F_m(k)$ and $F_n(k)$ can be expressed as:

$$F_m(k) = \sqrt{\frac{m}{n}} F_n(k) \quad 0 \leq k < n.$$

The DCT coefficient $F_m(k)$ for k (n≦k<m) is set to zero, which implies that the high frequency components of the input data are neglected. The equation for the two dimensional DCT coefficients can be derived from the above equation for the one dimensional DCT coefficients. When increasing the size of a two-dimensional image from p×q pixels to m×n pixels, the DCT coefficients for the enlarged image can be computed by the following equation:

$$F_{mn}(u, v) = \sqrt{\frac{m \times n}{p \times q}} F_{pq}(u, v) \quad \begin{array}{l} 0 \leq u < p \\ 0 \leq v < q \end{array}$$

where p≦m and q≦n. Consequently, $$\sqrt{\frac{m \times n}{p \times q}}$$

is the k-coefficient in this case.

The present invention may be embodied in optical disk drivers such as DVD players, digital broadcast receivers such as set-top boxes, and digital video devices such as HD TVs. More exemplary embodiments of the invention are described below.

Figure 9:
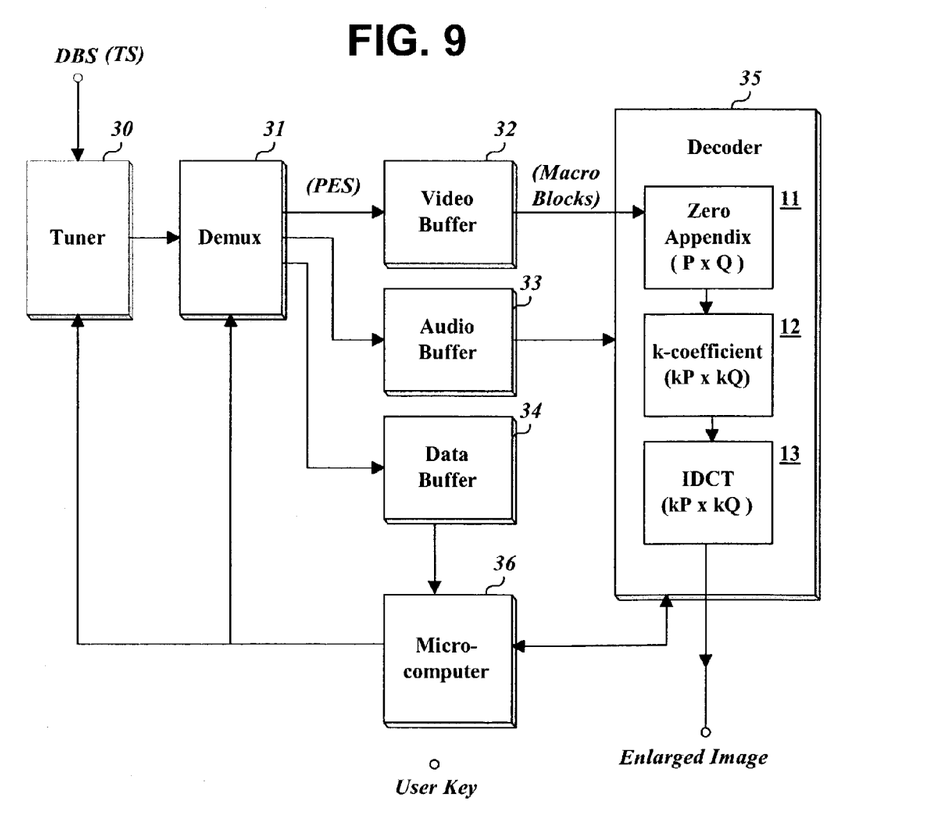
FIG. 9 is a block diagram of a digital broadcast receiver in accordance with one embodiment of the invention.

FIG. 9 depicts a block diagram of a digital broadcast receiver in accordance with an embodiment of the invention. The broadcast receiver comprises a tuner 30, a demultiplexer 31, a video buffer 32, an audio buffer 33, a data buffer 34, a decoder 35, and a microcomputer 35. The decoder 35 may include the zero appending unit 11, the k-coefficient multiplying unit 12, and the IDCT unit 13 depicted in FIG. 1.

The tuner 30 receives a required digital broadcast signal according to a command issued by the microcomputer 36.

The demultiplexer 31 outputs video, audio, and data streams of a user-selected program or sub-channel to the video buffer 32, audio buffer 33, and data buffer 34, respectively. The decoder 35 decodes the video and audio stream temporarily stored in the video buffer 32 and audio buffer 33 to retrieve original audio and video signals of the selected program or sub-channel.

The digital broadcast signal received by the tuner 30 is a transport stream and the video data outputted from the demultiplexer 31 is a packetized elementary stream. The zero appending unit 11 appends zeros to the high frequency area in each of the macro blocks received from the video buffer 32.

For example, suppose that when an original image is encoded, the original image is divided into macro blocks of size 8×8 pixels and a DCT operation is performed on each of the macro blocks to produce a corresponding DCT coefficient block. The zero appending unit 11 appends rows and columns of zeros as required to the high frequency area of each DCT coefficient block ($d_{1,1} \sim d_{n,m}$).

The k-coefficient multiplying unit 12 calculates the k-coefficient and multiplies the zero-appended DCT coefficient block ($a_{1,1} \sim a_{q,p}$) by the k-coefficient to prevent the resulting enlarged image from becoming distorted, as explained above with reference to FIG. 3.

The IDCT unit 13 performs an IDCT operation on the enlarged DCT coefficient block multiplied by the k-coefficient ($kd'_{1,1} \sim 0_{q,p}$) to produce an enlarged image block ($a'_{1,1} \sim a'_{q,p}$).

Consequently, the digital broadcast receiver provides the capability of enlarging an input image to an arbitrary size without resulting in distortions in the enlarged image.

Figure 10:
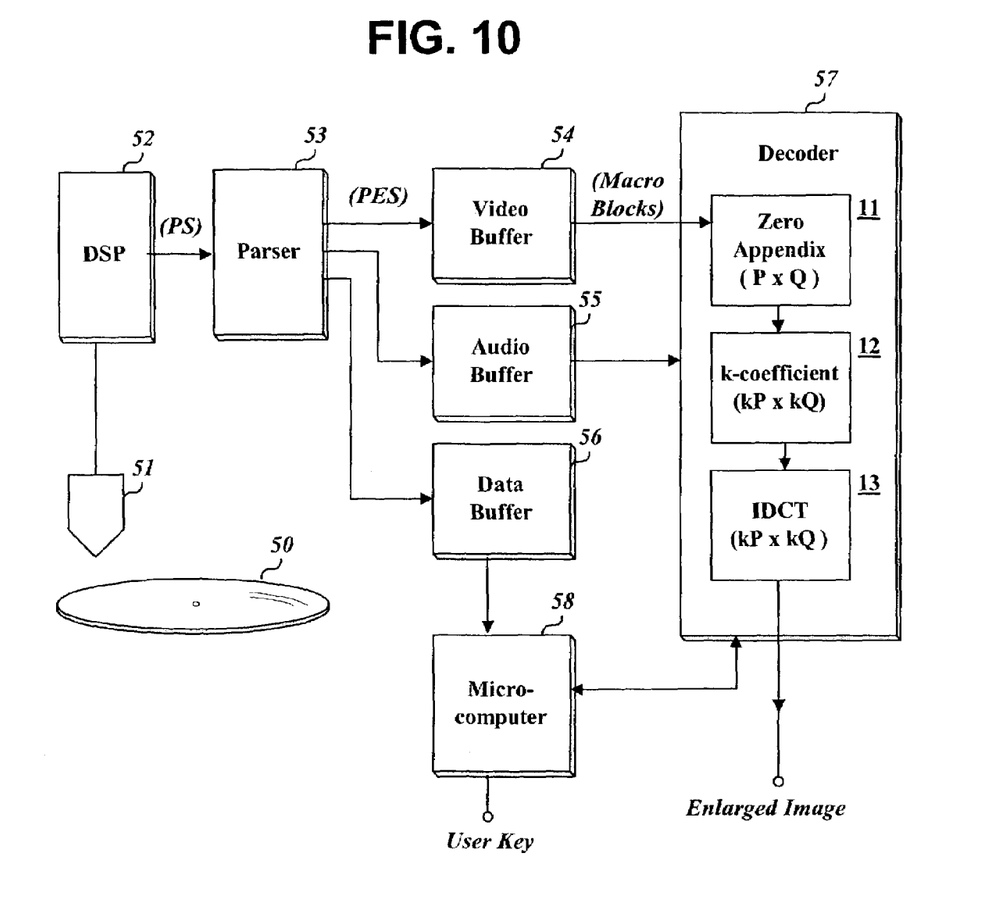
FIG. 10 is a block diagram of an optical disk drive in accordance with another embodiment of the invention.

FIG. 9 depicts a block diagram of an optical disk drive in accordance with another embodiment of the invention, comprising an optical pickup 50 for receiving optical signals from an the optical disk 50, a digital signal processing unit 52, a parser 53, a video buffer 54, an audio buffer 55, a data buffer 56, a decoder 57, and a microcomputer 58. The decoder 57 may include the zero appending unit 11, the k-coefficient multiplying unit 12, and the IDCT unit 13 depicted in FIG. 1.

The optical pickup 51 converts the optical information received from the optical disk 50 to electric signals. The digital signal processing unit 52 processes the electric signals after converting the signals into digital binary signals. The parser 53 separates the digital data received from the digital signal processing unit 52 into video, audio, and data to be stored in the video buffer 54, audio buffer 55, and data buffer 56, respectively.

The decoder 57 decodes the video and audio data temporarily stored in the video buffer 54 and audio buffer 55 to retrieve original audio and video signals recorded on the optical disk 50. The digital signal produced by the digital signal processing unit 52 is a program stream and the video data outputted from the parser 53 is a packetized elementary stream. The zero appending unit 11 appends zeros to the high frequency area in each of the macro blocks received from the video buffer 54.

Suppose that when an original video data is recorded on the optical disk 50, the original image is divided into image blocks of size 8×8 pixels and a DCT operation is performed on each of the image blocks. The data recorded on the optical disk 50 is the DCT coefficient blocks. The zero appending unit 11 appends rows and columns of zeros as required to the high frequency area of each received DCT coefficient block ($d_{1,1} \sim d_{n,m}$).

The k-coefficient multiplying unit 12 calculates the k-coefficient and multiplies the enlarged DCT coefficient block ($a_{1,1} \sim a_{q,p}$) by the k-coefficient to prevent the enlarged image from becoming distorted, as explained above with reference to FIG. 3.

The IDCT unit 13 performs an IDCT operation on the enlarged DCT coefficient block multiplied by the k-coefficient ($kd'_{1,1} \sim 0_{q,p}$) to produce an enlarged image block ($a'_{1,1} \sim a'_{q,p}$). The enlarged image blocks are combined to produce an enlarged complete image.

Consequently, the optical disk drive provides the capability of enlarging an input image to an arbitrary size without resulting in severe distortion in the enlarged image.

The method for resizing images in accordance with the present invention enables digital video processing devices such as DVD players, digital broadcast receivers, or HD TVs to enlarge an original image to an arbitrary size without resulting in distortions in the enlarged image, thereby preventing deteriorated image quality.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for resizing an original image using the inverse discrete cosine transform (IDCT), wherein the original image is divided into image blocks and each of the image blocks is discrete cosine transformed, said method comprising the steps of:
    (a) receiving discrete cosine transformed image blocks of size M×N, where M≠N, determining the size P×Q, where P≠Q to which each of the discrete cosine transformed image blocks is to be enlarged, and appending rows and columns of zeros to the high frequency area of each of the discrete cosine transformed image blocks so that the size of each of the discrete cosine transformed image blocks becomes the determined size P×Q;
    (b) computing a k-coefficient for the zero-appended discrete cosine transformed image blocks and multiplying each of the zero-appended discrete cosine transformed image blocks by the K-coefficient; and
    (c) performing inverse discrete cosine transform (IDCT) operations on the zero-appended discrete cosine transformed image blocks multiplied by the k-coefficient to produce enlarged image blocks of size P×Q;
    wherein the number of rows of each of the image blocks is determined by choosing a common divisor of the numbers of rows of the original image and an enlarged image to be produced and dividing the number of rows of the original image by the chosen common divisor and the number of columns of each of the image blocks is determined by choosing a common divisor of the numbers of columns of the original image and the enlarged image and dividing the number of columns of the original image by the chosen common divisor.

2. The method of claim 1, further comprising the step of producing an enlarged image by combining the enlarged image blocks of size P×Q.

3. The method of claim 1, wherein said k-coefficient is proportional to $$\sqrt{\frac{(P \times Q)}{(M \times N)}},$$

the square root value of the size of the zero-appended discrete cosine transformed image block divided by the size of the discrete cosine transformed image block.

4. The method of claim 1, wherein the numbers of the appended rows and columns of zeros depend on the size of an enlarged image to be produced.

5. A method for resizing an original image using the inverse discrete cosine transform (IDCT), wherein the original image is divided into image blocks and each of the image blocks is discrete cosine transformed, said method comprising the steps of:
    (a) receiving discrete cosine transformed image blocks of size M×N where M≠N from a data stream reproduced from a storage medium;
    (b) determining the size P×Q where P≠Q to which each of the discrete cosine transformed image blocks is to be enlarged and appending rows and columns of zeros to the high frequency area of each of the discrete cosine transformed image blocks so that the size of each of the discrete cosine transformed image blocks becomes the determined size P×Q;
    (c) computing a k-coefficient for the zero-appended discrete cosine transformed image blocks and multiplying each of the zero-appended discrete cosine transformed image blocks by the K-coefficient;
    (d) performing inverse discrete cosine transform (IDCT) operations on the zero-appended discrete cosine transformed image blocks multiplied by the k-coefficient to produce enlarged image blocks of size P×Q; and
    (e) producing an enlarged image by combining the enlarged image blocks of size P×Q;
    wherein the number of rows of each of the image blocks is determined by choosing a common divisor of the numbers of rows of the original image and the enlarged image to be produced and dividing the number of rows of the original image by the chosen common divisor and the number of columns of each of the image blocks is determined by choosing a common divisor of the numbers of columns of the original image and the enlarged image to be produced and dividing the number of columns of the original image by the chosen common divisor.

6. The method of claim 5, wherein said step (a) converts the program stream reproduced from the storage medium into a packetized elementary stream and extracts the discrete cosine transformed image blocks from the packetized elementary stream.

7. A method for resizing an original image using the inverse discrete cosine transform (IDCT), wherein the original image is divided into image blocks and each of the image blocks is discrete cosine transformed, said method comprising the steps of:
    (a) receiving discrete cosine transformed image blocks of size M×N where M≠N from a data stream reproduced from a storage medium;
    (b) determining the size P×Q where P≠Q to which each of the discrete cosine transformed image blocks is to be enlarged and appending rows and columns of zeros to the high frequency area of each of the discrete cosine transformed image blocks so that the size of each of the discrete cosine transformed image blocks becomes the determined size P×Q;

(c) computing a k-coefficient for the zero-appended discrete cosine transformed image blocks and multiplying each of the zero-appended discrete cosine transformed image blocks by the K-coefficient;

(d) performing inverse discrete cosine transform (IDCT) operations on the zero-appended discrete cosine transformed image blocks multiplied by the k-coefficient to produce enlarged image blocks of size P×Q; and (e) producing an enlarged image by combining the enlarged image blocks of size P×Q;

wherein the number of rows of each of the enlarged image blocks is determined by choosing a common divisor of the numbers of rows of the original image and the enlarged image to be produced and dividing the number of rows of the enlarged image to be produced by the chosen common divisor and the number of columns of each of the enlarged image blocks is determined by choosing a common divisor of the numbers of columns of the original image and the enlarged image to be produced and dividing the number of columns of the enlarged image to be produced by the chosen common divisor.

8. A method for resizing an original image using the inverse discrete cosine transform (IDCT), wherein the original image is divided into image blocks and each of the image blocks is discrete cosine transformed, said method comprising the steps of:

(a) receiving discrete cosine transformed image blocks of size M×N, where M≠N, determining the size P×Q, where P≠Q to which each of the discrete cosine transformed image blocks is to be enlarged, and appending rows and columns of zeros to the high frequency area of each of the discrete cosine transformed image blocks so that the size of each of the discrete cosine transformed image blocks becomes the determined size P×Q;

(b) computing a k-coefficient for the zero-appended discrete cosine transformed image blocks and multiplying each of the zero-appended discrete cosine transformed image blocks by the K-coefficient; and (c) performing inverse discrete cosine transform (IDCT) operations on the zero-appended discrete cosine transformed image blocks multiplied by the k-coefficient to produce enlarged image blocks of size P×Q, wherein the number of rows of each of the enlarged image blocks is determined by choosing a common divisor of the numbers of rows of the original image and the enlarged image to be produced and dividing the number of rows of the enlarged image to be produced by the chosen common divisor and the number of columns of each of the enlarged image blocks is determined by choosing a common divisor of the numbers of columns of the original image and the enlarged image to be produced and dividing the number of columns of the enlarged image to be produced by the chosen common divisor.

* * * * *